(12) United States Patent
Neema et al.

(10) Patent No.: US 10,956,241 B1
(45) Date of Patent: Mar. 23, 2021

(54) UNIFIED CONTAINER FOR HARDWARE AND SOFTWARE BINARIES

(71) Applicant: Xilinx, Inc., San Jose, CA (US)

(72) Inventors: Hem C. Neema, San Jose, CA (US); Sonal Santan, San Jose, CA (US); Soren T. Soe, San Jose, CA (US); Stephen P. Rozum, Loveland, CO (US); Nik Cimino, Frederick, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 15/848,691

(22) Filed: Dec. 20, 2017

(51) Int. Cl.
G06F 8/41 (2018.01)
G06F 9/54 (2006.01)
G06F 21/57 (2013.01)
G06F 21/53 (2013.01)
G06F 8/65 (2018.01)

(52) U.S. Cl.
CPC ............. G06F 9/545 (2013.01); G06F 8/44 (2013.01); G06F 21/53 (2013.01); G06F 21/572 (2013.01); G06F 8/65 (2013.01)

(58) Field of Classification Search
None
See application file for complete search history.

(56) References Cited

U.S. PATENT DOCUMENTS 6,883,087 B1 * 4/2005 Raynaud-Richard ........................ G06F 9/30178 710/68
7,810,055 B1 * 10/2010 Alexander .......... G06F 17/5054 716/103
7,873,934 B1 1/2011 Perry
(Continued)

FOREIGN PATENT DOCUMENTS

CN 1815628 A 8/2006
CN 102136012 A 7/2011
(Continued)

OTHER PUBLICATIONS

TIS Committee, "Tool Interface Standard (TIS) Executable and Linking Format (ELF) Specification," Version 1.2, May 1995, 106 pg., Tool Interface Standard Committee.
(Continued)

*Primary Examiner* — Shih-Wei Kraft
(74) *Attorney, Agent, or Firm* — Kevin T. Cuenot

(57) ABSTRACT

A computer program product can include a non-transitory computer readable storage medium storing a unified container. The unified container can include a header structure, wherein the header structure has a fixed length and specifies a number of section headers included in the unified container. The unified container can include a plurality of section headers equivalent to the number of section headers specified in the header structure. The unified container can include a plurality of data sections corresponding to the plurality of section headers on a one-to-one basis. The plurality of data sections includes a first data section including a hardware binary and a second data section including a software binary. The hardware binary and the software binary are configured to program a programmable integrated circuit. Each section header specifies a type of data stored in the corresponding data section and specifies a mapping for the corresponding data section.

10 Claims, 4 Drawing Sheets

(56) References Cited

U.S. PATENT DOCUMENTS

| | | | |
|---|---|---|---|
| 8,719,808 B1* | 5/2014 | Prinzing | G06F 9/44542 |
| | | | 717/162 |
| 9,218,443 B1 | 12/2015 | Styles et al. | |
| 2007/0006137 A1* | 1/2007 | Savagaonkar | G06F 9/445 |
| | | | 717/106 |
| 2012/0185584 A1* | 7/2012 | Pandit | G06F 11/3466 |
| | | | 709/224 |
| 2012/0310983 A1* | 12/2012 | Mittal | G06F 21/44 |
| | | | 707/785 |
| 2013/0212365 A1 | 8/2013 | Chen et al. | |
| 2014/0176187 A1* | 6/2014 | Jayasena | H03K 19/1776 |
| | | | 326/39 |
| 2015/0379290 A1* | 12/2015 | Shinke | G06F 8/70 |
| | | | 726/28 |
| 2016/0342722 A1* | 11/2016 | Sentieys | G06F 15/7871 |
| 2019/0087606 A1* | 3/2019 | Subhaschandra | G06F 21/76 |

FOREIGN PATENT DOCUMENTS

| | | |
|---|---|---|
| CN | 103809999 A | 5/2014 |
| WO | 00/38087 A1 | 6/2000 |
| WO | 2011/116478 A1 | 9/2011 |

OTHER PUBLICATIONS

Xilinx, "SDAccel Development Environment User Guide," UG1023 (v.2015.1), Sep. 15, 2015, 95 pg.. Xilinx, Inc., San Jose, California, USA.

\* cited by examiner

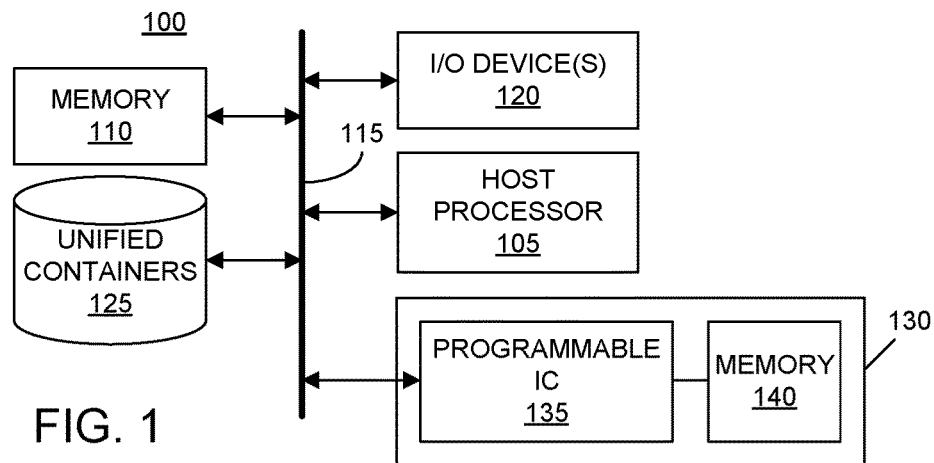
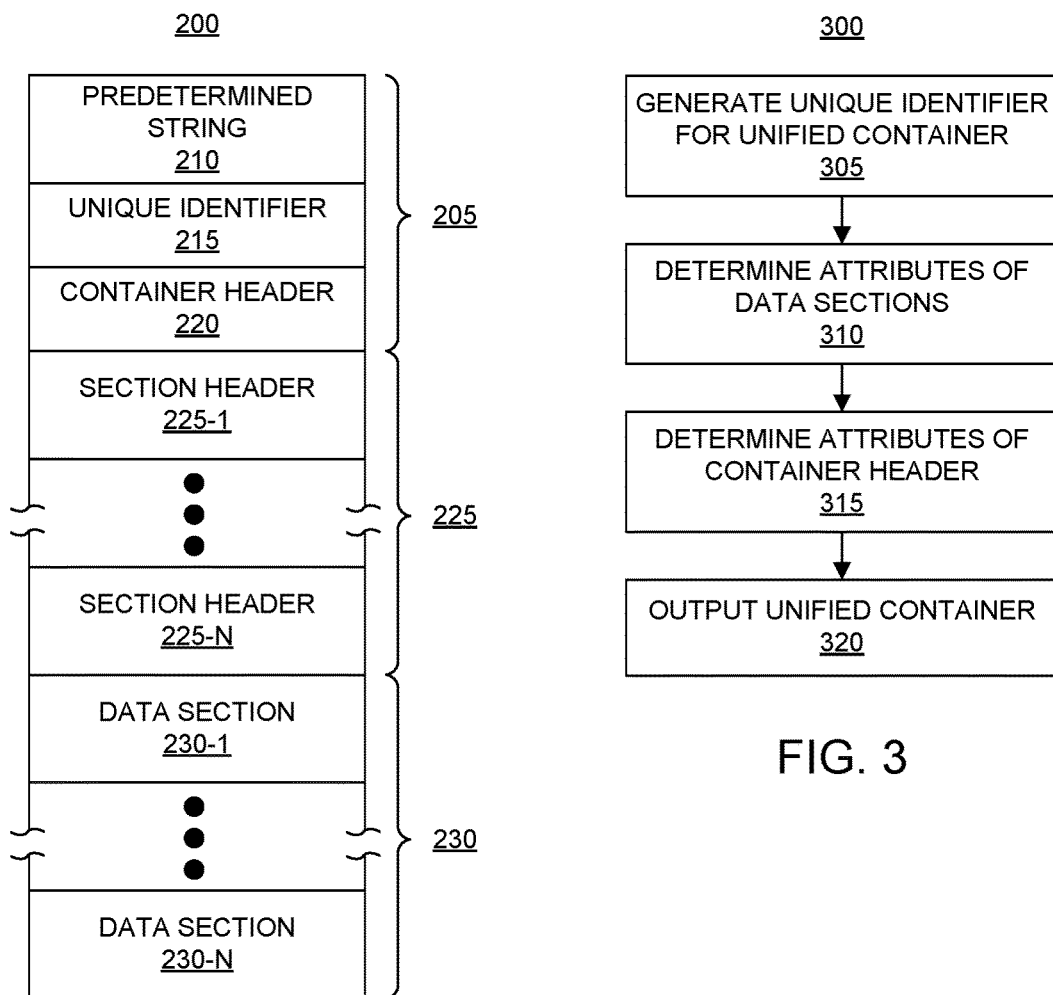
FIG. 1
FIG. 2
FIG. 3

UNIFIED CONTAINER FOR HARDWARE AND SOFTWARE BINARIES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to storing and packaging hardware and software binaries for use with configuring programmable integrated circuits.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), multipliers, digital signal processing blocks (DSPs), processors, clock managers, and delay lock loops (DLLs).

Circuit designs may be physically implemented within the programmable circuitry of a programmable IC by loading a configuration bitstream into configuration memory of the programmable IC. In the case where the programmable IC includes an embedded processor, program code to be executed by the embedded processor is also loaded into the programmable IC.

SUMMARY

One or more embodiments are directed to computer program products. In an aspect, a computer program product includes a non-transitory computer readable storage medium storing a unified container for a programmable integrated circuit (IC). The unified container can include a header structure having a fixed length and specifying a number of section headers included in the unified container. The unified container also can include a plurality of section headers equivalent in number to the number of section headers specified in the header structure. The unified container further can include a plurality of data sections corresponding to the plurality of section headers on a one-to-one basis. The plurality of data sections can include a first data section including a hardware binary and a second data section including a software binary. The hardware binary and the software binary configure the programmable IC. Each section header can specify a type of data stored in the corresponding data section and a mapping for indexing to the corresponding data section.

One or more embodiments are directed to methods for implementing a unified container. In one aspect, a method can include providing a non-transitory computer readable storage medium storing a unified container for a programmable IC. The method can include providing, within the unified container, a header structure having a fixed length and specifying a number of section headers included in the unified container. The method can include providing, within the unified container, a plurality of section headers equivalent in number to the number of section headers specified in the header structure. The method further can include providing, within the unified container, a plurality of data sections corresponding to the plurality of section headers on a one-to-one basis. The plurality of data sections can include a first data section including a hardware binary and a second data section including a software binary, wherein the hardware binary and the software binary configure the programmable IC. Each section header can specify a type of data stored in the corresponding data section and a mapping for the corresponding data section.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 1 illustrates an example of a data processing system for use with one or more embodiments described herein.

FIG. 2 illustrates an example layout for a unified container.

FIG. 3 illustrates an example method for implementing a unified container.

DETAILED DESCRIPTION OF THE DRAWINGS

Figure 4:
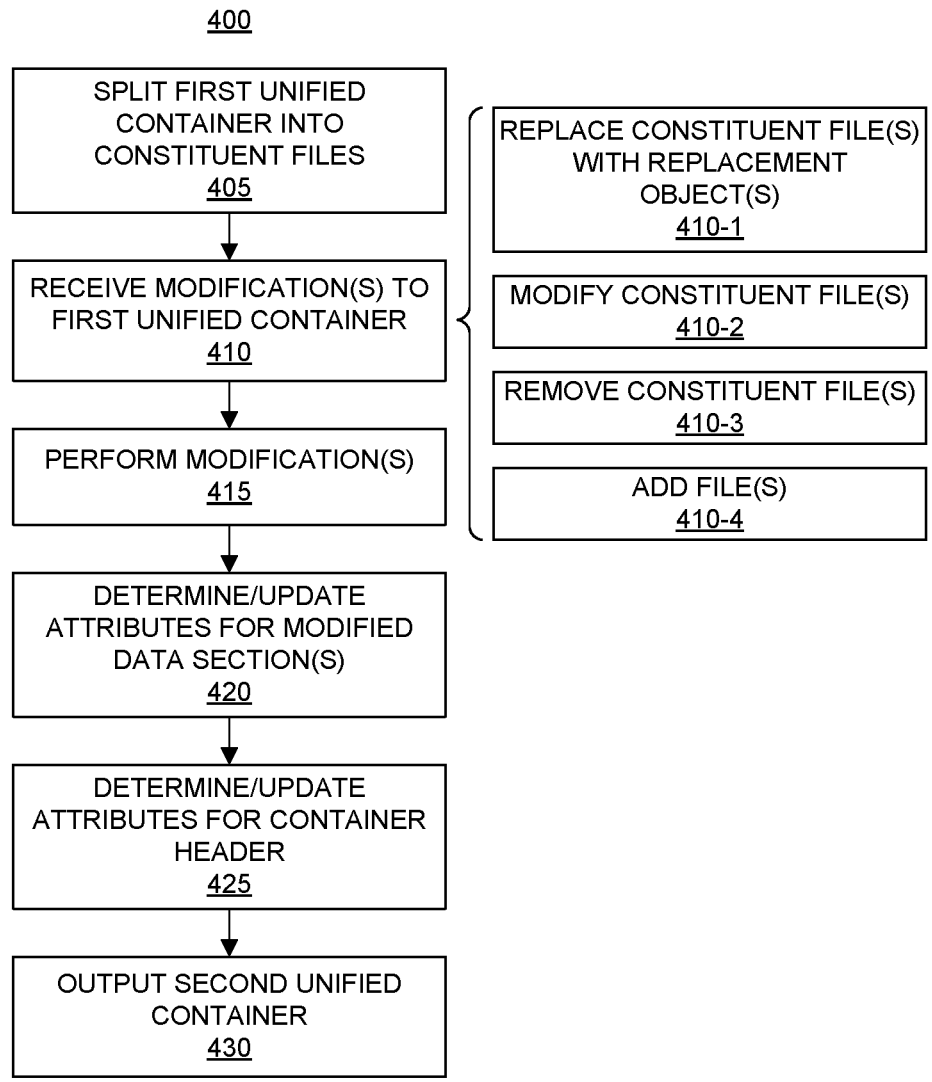
FIG. 4 illustrates an example method for reforming a unified container.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to storing and packaging hardware and software data for use with configuring a programmable integrated circuit (IC). In accordance with the inventive arrangements described herein, a unified container is provided. The unified container is capable of storing any of a variety of different section types. The different varieties of files stored in the sections may be hardware and/or software related for configuring one or more elements of a programmable IC. For purposes of illustration and not limitation, the unified container may store one or more hardware binaries for configuring the programmable IC and/or one or more software binaries for configuring the programmable IC. Other examples of data that may be included within a unified container include, but are not limited to, files for debugging hardware and/or software for the programmable IC and metadata describing one or more features of the various files included within the unified container.

In one or more embodiments, the unified container is extensible. In this regard, a unified container may be processed so that the constituent files stored within the unified container are made available for use and/or editing by a data processing system. As such, one or more of the constituent files of the unified container may be updated by modification or may be deleted. Further, one or more new files may be designated for addition to the unified container. The unified container may be reformed using the updated files, by excluding deleted files, and/or by including one or more additional files.

The unified container is also extensible in that additional file types may be defined and added to a given unified container. The types of files that may be included in a unified container are not restricted or limited. For example, the unified container is not limited to including only a predetermined list or set of file types. In particular embodiments, the unified container supports chaining of multiple unified containers to further support extensibility.

In one or more embodiments, the unified container is capable of including a mapping of the various files included therein. Storing a mapping of the files included in the unified container facilitates access to any particular file stored within the unified container without having to traverse through the different sections of the unified container sequentially to locate a particular region and/or file of interest. Rather, a system is capable of using the mapping to index into the unified container directly to the file of interest to read out only the particular file or files that are needed. This aspect of the unified container(s) improves runtime operation of the data processing system that is handling the unified container(s).

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a data processing system (system) 100 for use with one or more embodiments described herein. In an aspect, system 100 is implemented as a computer or other system or device that is suitable for storing and/or executing program code. System 100 is an example of a heterogeneous data processing system in that computing tasks may be performed by host processor 105 and one or more other devices such as programmable IC 135.

In the example of FIG. 1, system 100 includes at least one host processor 105. Host processor 105 is capable of carrying out or executing computer readable instructions (also referred to herein as "program code"). Host processor 105 is coupled to memory 110 through interface circuitry 115. Memory 110 is an example of computer readable storage media.

Memory 110 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code to reduce the number of times program code must be retrieved from a bulk storage device during execution.

In the example of FIG. 1, system 100 includes a bulk storage device 125 that is capable of storing one or more unified containers. While bulk storage device 125 is shown as being included within system 100, in one or more other embodiments, bulk storage device 125 is implemented in another data processing system or as a network attached storage device that is coupled to system 100.

Examples of interface circuitry 115 include, but are not limited to, an input/output (I/O) subsystem, an I/O interface, a bus system, and a memory interface. For example, interface circuitry 115 may be implemented as a bus structure or a combination of bus structures. Examples of bus structures include, but are not limited to, a memory bus and/or memory controller, a peripheral bus, an accelerated graphics port, and a processor or local bus. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

In the example of FIG. 1, system 100 includes a hardware platform 130. Hardware platform 130 may be implemented as a printed circuit board, e.g., a card, with a programmable IC 135 and a memory 140 coupled thereto. Programmable IC 135 is coupled to memory 140. Memory 140 may include volatile memory and/or non-volatile memory as described in connection with memory 110. For example, memory 140 may include some type of RAM and/or flash memory. Programmable IC 135 is coupled to host processor 105 via hardware platform 130 and interface circuitry 115. In one or more embodiments, hardware platform 130 includes an interface that couples to interface circuitry 115. For example, hardware platform 130 may include a Peripheral Component Interconnect Express (PCIe) interface. The example interfaces provided herein are for purposes of illustration and not limitation. Accordingly, programmable IC 135 is capable of operating as a peripheral device and/or a hardware accelerator of host processor 105. Host processor 105 is capable of offloading one or more processing jobs or tasks to programmable IC 135.

Memory 110 is capable of storing program code. The program code may include routines, programs, objects, components, logic, data structures, and so on. For purposes of illustration, memory 110 is capable of storing an operating system and one or more application(s). Host processor 105 executes the program code accessed from memory 110 via interface circuitry 115. In an aspect, host processor 105 is capable of executing the operating system and application(s) to perform the operations described within this disclosure. As such, the operating system and the application(s) may be considered an integrated part of system 100. Further, it should be appreciated that any data used, generated, and/or operated upon by host processor 105 are functional data structures that impart functionality when employed as part of system 100.

In one or more embodiments, the application(s) stored in memory 110 include one or more host applications configured to execute in coordination with a hardware platform 130. Host processor 105 is capable of providing a common set of application programming interface (API) functions referred to as a runtime library. In one or more embodiments, the host application(s) include OpenCL applications. For example, the API functions may be OpenCL API functions. The runtime library is capable of translating user or host processor 105 commands into hardware specific commands for a given device such as hardware platform 130 and/or programmable IC 135. The runtime library can be linked with the host application(s) at compile time.

In particular embodiments, host processor 105 is capable of reading and writing unified containers stored in bulk storage 125. For example, host processor 105 is capable of reading a unified container and outputting data read from the unified container, extracting one or more files stored within the unified container for use, and reforming (e.g., re-writing) the unified container. Memory 110, for example, may store utilities, e.g., program code, for reading and writing unified containers.

Accordingly, host processor 105, in executing a host application, is capable of retrieving one or more of the unified containers stored in bulk storage device 125, obtaining any needed data from the retrieved unified container, and using the data to communicate with, control, and/or configure programmable IC 135. An example architecture for implementing programmable IC 135 is described in greater detail in connection with FIG. 7.

As an illustrative and non-limiting example, host processor 105 is capable of retrieving a unified container from bulk storage device 125 and extracting a hardware binary from the unified container. The hardware binary may be a configuration bitstream or a partial configuration bitstream. Host processor 105 is capable of providing the configuration bitstream to programmable IC 135. Programmable IC 135, in response to receipt of the configuration bitstream, is capable of loading the configuration bitstream into configuration memory therein for implementation of circuitry specified by the configuration bitstream within programmable IC 135.

Host processor 105 is capable of providing a hardware binary obtained from a unified container to programmable IC 135 "on the fly" or during runtime. The hardware binary, when loaded into programmable IC 135, creates or implements the actual hardware or circuitry used within programmable IC 135. For example, the hardware binary implements a particular circuit design within the programmable circuitry available within programmable IC 135. In this manner, host processor 105 is able to implement different circuits and/or systems within programmable IC 135 as needed, e.g., in real time, based upon the particular hardware binary retrieved from a unified container and provided to programmable IC 135.

As another illustrative and non-limiting example, host processor 105 is capable of extracting a software binary from the same unified container. The software binary may be executable program code that is intended for execution by an embedded processor within programmable IC 135. The software binary may be an "exe" file or other executable file. In particular embodiments, the executable program code may be stored within the unified container as an Executable and Linkable Format (ELF) file. Host processor 105 is capable of providing the executable program code to programmable IC 135. Programmable IC 135, in response to receipt of the executable program code, is capable of loading the executable program code into program execution memory of an embedded processor within programmable IC 135.

Subsequent to the loading of the executable program code, the embedded processor of programmable IC 135 is capable of executing the executable program code.

In particular embodiments, one or more of the applications executable by system 100 may be electronic design automation (EDA) applications. An EDA application may include one or more hardware compilers and/or one or more software compilers. The hardware compilers are capable of performing a design flow (e.g., synthesis, placement, routing, and/or configuration bitstream generation) on program code, whether hardware description language or a high-level programming language such as C and/or C++. The software compilers are capable of generating object code from source code, wherein the resulting object code is executable by one or more embedded processors of programmable IC 135.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

FIG. 2 illustrates an example layout for a unified container 200. For purposes of illustration, FIG. 2 presents a simplified layout view to better illustrate particular structural features of unified container 200. In one or more embodiments, unified container 200 is a file having an organized data structure that may be used by a data processing system such as system 100 to interact with a programmable IC such as programmable IC 135. Unified container 200 is capable of storing any data needed to configure and/or debug programmable IC 135 within a single, unified file. For example, any hardware binaries, software binaries (e.g., firmware), debug data, and/or metadata for configuring programmable IC 135 for a particular purpose and/or functions can be stored within unified container 200. Unified container 200 is capable of storing all data needed by host processor 105 to configure and/or reconfigure programmable IC 135 in one location or source file.

In particular embodiments, unified container 200 is implemented as a binary file. Unified container 200, for example, can be encoded as described herein by a data processing system such as data processing system 100 as a binary file that includes one or more files embedded therein. Unified container 200 further includes mapping information thereby allowing a data processing system to access any portion of unified container 200, e.g., any file included therein, without having to traverse each different section of unified container 200 sequentially to locate the desired data. The data processing system need not load the entirety of unified container 200 into program execution memory (e.g., RAM) to locate and extract data of interest. In this regard, unified container 200 allows a data processing system to gain access to the file(s) stored therein in less time resulting in faster runtime performance of the data processing system.

In general, unified container 200 is capable of including different types of data including, but not limited to, one or more hardware binaries, one or more software binaries, metadata, and/or debug data. As defined herein, the term "hardware binary" means a configuration bitstream whether a full configuration bitstream or a partial configuration bitstream. The term "configuration bitstream" is used herein to refer to either one or both of a full configuration bitstream and a partial configuration bitstream. As defined herein, the term "software binary" means executable program code for a processor. In an aspect, the processor is an embedded processor of a programmable IC such as programmable IC 135. In particular embodiments, executable program code can be included within another file structure such as an ELF file that is embedded within unified container 200. Unified container 200 is also capable of including multiple different firmware sections, where each different firmware section is capable of storing a software binary. Each different firmware section, for example, may be for a different one of a plurality of embedded processors within programmable IC 135.

In one or more embodiments, metadata included in unified container 200 is automatically generated by an EDA application that generates a hardware binary and/or a software binary. The metadata is capable of describing the content of one or more hardware binaries and/or one or more software binaries. The metadata, for example, may specify the functionality of the hardware binary and/or a list of cores included in the hardware binary. The metadata, for example, may specify the particular embedded processor for which a software binary is to be used. The metadata may be formatted as an Extensible Markup Language (XML) file or using another suitable syntax. The metadata is readable by host processor 105 to understand and determine the content of unified container 200.

In one or more embodiments, unified container 200 is a binary library of kernel compute units that are loaded together, in an OpenCL context, into a specific hardware platform and/or programmable IC. Unified container 200, for example, is capable of holding or storing programming files for the programmable circuitry of the programmable IC and/or shared libraries (e.g., firmware) for processor(s) that are embedded in the programmable IC. As discussed, unified container 200 is also capable of storing descriptive metadata that may be used by the host processor at runtime during host program execution.

In one or more embodiments, debug data includes information necessary to set one or more breakpoints in the software binaries and/or high-level programming language source code. For example, the unified container may include a software binary in one region and source program code for the software binary in another, different region. The breakpoint information is capable of specifying a breakpoint in the software binary that can be correlated to a particular location in the source code. The breakpoint information is capable of specifying a breakpoint in the source code that can be correlated to a particular location in the software binary.

In one or more embodiments, debug data includes information necessary to set one or more breakpoints in HDL (e.g., register transfer level (RTL) format) program code and/or in circuitry. In particular embodiments, unified container 200 may store a configuration bitstream in one region and the HDL program code for the configuration bitstream in another, different region. In one example, the debug information is capable of specifying a breakpoint location in the HDL that may be used during HDL simulation.

In another example, the debug information is capable of specifying a breakpoint location in the configuration bitstream that can be correlated to a particular location (e.g., a line) in the HDL. As an illustrative and non-limiting example, the source of the configuration bitstream (e.g., HDL or RTL) specifies signals, variables, line numbers, and translation information from operations performed in translating the RTL into the configuration bitstream. This static information can be captured and stored in a section of unified container 200. Subsequently, when the circuitry is running, hardware in the circuitry is used to detect the breakpoint. The particular state encountered in the circuitry can be correlated or matched with a particular line number of the RTL and/or particular variable values of the RTL using the translation information stored in unified container 200.

The debug data is also capable of including one or more executable utilities that support the setting of breakpoints, including hardware breakpointing pointing, as described herein. A data processing system is capable of locating, accessing, and executing the executable utilities from unified container 200 to set a breakpoint for any of the various scenarios described herein.

In the example of FIG. 2, unified container 200 includes a header structure 205, one or more section headers 225, and one or more data sections 230. In one or more embodiments, header structure 205 includes a predetermined string 210, a unique identifier 215, and a container header 220. In particular embodiments, header structure 205 has a fixed length.

Within header structure 205, predetermined string 210 can be a predetermined character string that identifies the unified container file as a unified container. In particular embodiments, the predetermined string may include the characters "xclbin". As an illustrative and non-limiting example, the predetermined string may be "xclbin\0". Within header structure 205, unique identifier 215 may be a value or string that uniquely identifies unified container 200. As an illustrative example, unique identifier 215 may be specified as a 64-bit unsigned integer value. Each different unified container has a different unique identifier 215. Thus, unique identifier 215 uniquely identifies unified container 200 thereby distinguishing unified container 200 from other unified containers having different files embedded therein.

In particular embodiments, a system is capable of reading the unique identifier from a unified container upon using a file from the unified container to configure, access, and/or communicate with a particular programmable IC. The system is capable of storing the unique identifier for the unified container in memory for purposes of comparison in the future. As an illustrative and non-limiting example, the system, in executing a host application, may attempt to retrieve a particular unified container for use in configuring, accessing, and/or communicating with the programmable IC. The system is capable of comparing the unique identifier of the unified container to be retrieved with the unique identifier of a unified container from which a file has already been downloaded to the programmable IC. In response to determining that the two unique identifiers match, the system determines that the unified container has already been retrieved and used to load the programmable IC. As such, the system need not download the unified container or a portion thereof again to the programmable IC, thereby increasing runtime speed of the host processor.

In another example, the host processor is capable of comparing the unique identifiers with one or more rules that specify particular operations to be performed in response to accessing a particular unified container. As an illustrative and non-limiting example, a rule may specify that if the unique identifier of a new container matches the unique identifier of a container already running on the hardware, the host processor skips programming programmable IC 135, e.g., skips programming the programmable circuitry and/or any embedded processors within programmable IC 135. The host processor is able to avoid performing redundant configurations of programmable IC 135 after determining that programmable IC 135 is already configured from the unified container. Further, by using the unique identifiers, the host processor is able to detect that two unified containers are the same while avoiding more detailed and time-consuming comparisons of the constituent files of different unified containers.

Within header structure 205, container header 220 specifies general information about unified container 200 as a whole. For example, container header 220 is capable of specifying the size of unified container 200 (e.g., the file size of the unified container). Container header 220 is capable of specifying a version number for the particular software utility, application, or tool used to generate or write unified container 200. The version number can indicate particular features and/or a mapping of data in the various header portions of unified container 200. Container header 220 is also capable of specifying a number of section headers 225 (e.g., "N") included in unified container 200.

Listing 1 illustrates an example of a header structure 205. For purposes of illustration, Listing 1 uses C++ header file format. The predetermined string is illustrated in Example 1 as "m_magic". The in-line header "m_header" references the xclBin1Header struct. Within the xclBin1Header struct, the total size of the unified container, a platform identifier specifying a particular hardware platform that the unified container may be used with, the name of the data section with debug information, if any, and the number of section headers 225 included in unified container 200 are specified. A platform identifier indicates the manufacturer and model of the particular type of hardware platform (and programmable IC) with which the unified container may be used. A system, for example, is capable of checking that the hardware platform specified by unified container 200 matches the particular hardware platform to be configured based upon the platform identifier specified in unified container 200 thereby preventing errors and other possible damage to the hardware platform and/or system. In the case where the platform identifier of unified container 200 does not match the platform identifier of hardware platform 130, for example, as read by the host processor, the host processor does not use unified container 200 to configure programmable IC 135 and instead, for example, may issue an error.

In one or more embodiments, header structure 205 includes information pointing to a next unified container in a daisy chain of two or more unified containers. The daisy chain feature enables further extensibility of the unified containers. In the example of Listing 1 below, "m_nextXclBin[16]" specifies the name of another unified container that is next in a daisy chain of such unified containers. Still, it should be appreciated that daisy chaining need not be implemented and that a unified container may be used independently of other unified containers. Additional information included in header structure 205 is shown below in Listing 1.

Listing 1

```
struct xclBin1 {
    char m_magic[8]; /* Should be xclbin1\0 */
    uint64_t m_signature[256]; /* File signature for validation of binary */
    struct xclBin1Header m_header; /* In-line header */
    struct xclBin1SectionHeader m_sections[1]; /* One or more section headers follow */};
struct xclBin1Header {
    uint64_t m_length; /* Total size of the xclbin file */
    uint64_t m_timeStamp; /* Number of seconds since epoch when xclbin was created */
    unsigned m_version; /* Tool version used to create xclbin */
    unsigned m_mode; /* XCLBIN MODE */
    uint64_t m_platformId; /* 64 bit platform ID: vendor-device-subvendor-subdev */
    uint64_t m_featureId; /* 64 bit feature id */
    char m_nextXclBin[16]; /* Name of next xclbin file in the daisy chain */
    char m_debugBin[16]; /* Name of binary with debug information */
    unsigned m_numSections; /* Number of section headers */};
```

Unified container 200 includes one or more section headers 225. In the example of FIG. 2, unified container 200 includes 1-N section headers 225, where "N" is an integer value. In particular embodiments, each section header 225 is a fixed length.

In one or more embodiments, unified container 200 includes one section header 225 for each data section 230 that is included. Section headers 225 and data sections 230 have a one-to-one correspondence. For example, section header 225-1 corresponds to data section 230-1. Section header 225-N corresponds to data section 230-N. Section header 225-1 specifies attributes describing data section 230-1. Similarly, section header 230-N specifies attributes describing data section 230-N In one or more embodiments, each section header 225 specifies the type of data that is included in the corresponding data section 230. For example, different types of data, e.g., files, that can be specified include, but are not limited to, a full configuration bitstream, a partial configuration bitstream, a clearing bitstream, executable program code (e.g., firmware), debug data, and metadata. As discussed, each section header 225 specifies mapping data for the corresponding data section 230. In an embodiment, the mapping data includes an offset of the corresponding data section 230. In particular embodiments, the mapping data includes a size and an offset for the corresponding data section 230. The offset may be specified with reference to the start of unified container 200. Each data section 230 includes the particular type of data, e.g., file, indicated by the corresponding section header 225.

Listing 2 illustrates an example of a section header 225. For purposes of illustration, Listing 2 uses a C++ header file format. The type of data included in the data section corresponding to the section header is specified by "m_sectionKind". Example values that may be stored in "m_sectionKind" include but are not limited to, "BITSTREAM=0", "CLEARING_BITSTREAM", "EMBEDDED_METADATA", "FIRMWARE", and "DEBUG_DATA". The value "BITSTREAM=O" provides an integer code to the enumeration pneumonic. The value "CLEARING_BITSTREAM" refers to a blanking configuration bitstream. A clearing bitstream is a partial configuration bitstream that is used to clear another partial configuration bitstream from programmable IC 135 prior to loading another partial configuration bitstream into programmable IC 135.

For example, unified container 200 can include one or more partial configuration bitstreams. Unified container 200 further may include a clearing bitstream for each partial configuration bitstream. In particular embodiments, the metadata identifies pairs of configuration bitstreams composed of a partial configuration bitstream within the unified container and a clearing bitstream within the unified container to be used to clear the paired partial configuration bitstream from programmable IC 135 before loading a new and/or different partial configuration bitstream specifying different circuitry therein. Thus, the host processor, by reading the metadata, is able to determine which partial bitstream to use from the unified container to clear a particular partial configuration bitstream from programmable IC 135 prior to loading another, different partial configuration bitstream.

The value "FIRMWARE" is used to indicate executable program code for an embedded processor of the programmable IC. Unified container 200 is capable of including one or more different firmware sections corresponding to different (e.g., multiple) embedded processors within programmable IC 135. For example, programmable IC 135 may include one or more hardwired processors and/or one or more soft processors. Unified container 200 is capable of including multiple firmware sections so that firmware for each embedded processor of programmable IC 135 is stored within unified container 200 (e.g., a single unified container).

Further information relating to the corresponding data section specified by section header 225 can include, but is not limited to, a target operational (e.g., clock) frequency for the section (e.g., for a hardware binary), the number of kernels in the hardware binary if applicable, the offset of the file in the corresponding data section, and the size of the corresponding data section.

Listing 2

```
struct xclBin1 Section Header {
    unsigned m_sectionKind; /* Section type */
    unsigned short m_freq[4]; /* Target frequency for the section if applicable */
    char m_sectionName[16]; /* Examples: "stage2", "clear1", "clear2", "ocl1", "ocl2", "ublaze" */
    unsigned m_customFlagsA; /* Example: Number of Kernels in this region */
    unsigned m_customFlagsB; /* Example: Number of Kernels in this region */
    uint64_t m_sectionOffset; /* File offset of section data */
    uint64_t m_sectionSize; /* Size of section data */};
```

Each data section 230 includes a file of the particular type specified by the corresponding section header 225. For example, data section 230-1 includes a file of the type specified by section header 225-1. In particular embodiments, data sections 230 may be of any length, e.g., are not fixed in length. As such, data section 230-1 may be a same or a different size than data section 230-N. The size of each respective data section 230 is independent of each other data section.

In one or more embodiments, a unified container may include multiple copies of the same data section. In particular embodiments, the unified container includes multiple configuration bitstreams, e.g., partial configuration bitstreams, where each is stored in a different data section and each targets, or is for, a different partially reconfigurable region in the programmable IC. In another example, each data section storing a partial configuration bitstream for a particular, or same, reconfigurable region may be associated with one another. As such, data sections of unified container 200 that are associated with one another, e.g., as specified by the metadata, may only be relevant to a particular reconfigurable region. The metadata is capable of describing the purpose and use of different partial configuration bitstreams.

Partial reconfiguration is a process where a reconfigurable region of the programmable IC, e.g., a region of programmable circuitry, may be dynamically reconfigured by loading a partial configuration bitstream into the programmable IC. The partial configuration bitstream, for example, may specify different circuitry and/or a different system than previously implemented in the reconfigurable region. The partial configuration bitstream does not specify new and/or different circuitry for portions of programmable circuitry outside of the reconfigurable region. The reconfigurable region may undergo modification through partial reconfiguration while the other regions of the programmable circuitry of the programmable IC continue to operate without interruption. A clearing bitstream is used to clear the partial reconfiguration region before loading a new or different partial configuration bitstream for the reconfigurable region as described.

FIG. 3 illustrates an example method 300 of generating a unified container. Method 300 is performed by a data processing system as described herein. For example, method 300 may be performed by system 100 in executing the write utility. In one or more embodiments, a system configured for writing unified containers receives a plurality of files for inclusion within a unified container. The files may be provided or specified from a received user input and/or from another process or system.

In block 305, the system is capable of generating a unique identifier for the unified container to be created. In block 310, the system is capable of determining the attributes of the data sections. For example, the system is capable of determining the type of file to be included in each data section, the size of each file, and other attributes specified within the section header for each data section. The system is capable of calculating offsets for the various data sections of the unified container based upon the determined size of each file to be included in the unified container, the fixed length of the header structure, and the fixed length of each section header.

In block 315, the system is capable of determining the attributes of the container header. For example, the system determines the number of section headers to be included in the unified container, the total size of the unified container, the platform identifier, and the tool version number. The system, for example, is capable of determining the that the number of data sections to be included in the unified container is equal to the number of files to be included in the unified container.

In block 320, the system outputs the unified container. For example, the system is capable of writing the unified container to memory. The system is capable of encoding the header structure using the unique identifier, the predetermined string, and the attributes of the container header. The system is capable of encoding each of the section headers using the attributes determined in block 310. The system further is capable of encoding each of the data sections of the unified container.

FIG. 4 illustrates an example method 400 of reforming a unified container. Method 400 is performed by a data processing system as described herein. For example, method 400 may be performed by system 100 in executing the read and write utility. In one or more embodiments, a system configured for reading and writing unified containers receives a request to modify a unified container.

In block 405, the system is capable of splitting a first unified container into a plurality of the constituent files included in the data sections of the unified container. The system is capable of extracting the file from each data section of the unified container and writing the file to a region in memory. For example, the system is capable of writing the file from each data section to a particular folder or directory in memory.

In one or more embodiments, the system preserves the header structure and/or the section headers of the unified container. By preserving the header structure (e.g., one or more or all portions of the header structure such as the predetermined string, the unique identifier, and/or the container header) and/or section headers, e.g., by writing the header structure and/or section headers to a file, the system need not regenerate such data. Instead, the system can update those portions that have changed thereby increasing speed of execution in reforming the unified container.

In block 410, the system receives one or more modifications to the first unified container. For example, the modification(s) may be specified by one or more user specified inputs or received from another process or system. Blocks 410-1, 410-2, 410-3, and 410-4 illustrate examples of different modifications that can be specified and performed by the system.

In block 410-1, for example, the system optionally receives a request to replace one or more files of data region(s) with replacement (e.g., another different) objects. As an illustrative and non-limiting example, the first unified container may include a hardware binary and/or a software binary. In one or more embodiments, the instruction is to replace the file, e.g., the hardware or software binary, with a replacement object such as a reference to the file stored elsewhere in memory outside of the unified container. The reference, for example, may be a link or a pointer.

In one or more embodiments, the object may be a design check point (DCP) file. A DCP file is a file that stores the physical database of a circuit design or a portion of a circuit design including the netlist from any selected step or phase of a design flow. For example, the DCP file may be used to store the state of a circuit design after synthesis, after placement, or after routing as performed by an EDA tool. A DCP file stores a snapshot of the state of the circuit design at a particular point within the design flow. As an illustrative and non-limiting example, a DCP file may include the current netlist, any optimizations made during implementation, the design constraints, and any implementation results. A DCP file can be run, using the EDA tool, though the remainder of the design flow.

As an illustrative and non-limiting example, a DCP may be included in the unified container instead of a configuration bitstream. An end user may be given access to the unified container. The DCP may be accessed from the unified container and operated upon by an EDA tool to generate a configuration bitstream. The tool may modify the unified container by replacing the DCP with a reference to the resulting configuration bitstream generated from the DCP. In this example, a system is capable of providing a user with access to the unified container having the DCP and/or the unified container having the reference to the configuration bitstream, but prevent the user from gaining direct access to the configuration bitstream itself.

In block 410-2, for example, the system optionally receives a request to include a modified or updated version of a file within the unified container. For example, a hardware binary and/or a software binary may be updated. The updated hardware binary and/or software binary may be included within the reformed unified container in place of the prior version of the hardware binary and/or software binary.

In block 410-3, for example, the system optionally receives a request to remove or delete one or more of the files from the unified container. In block 410-4, for example, the system optionally receives a request to add one or more files to the unified container. For example, a third-party hardware platform manufacturer is capable of editing a unified container provided by the programmable IC manufacturer to be used on the hardware platform and remove files that are not applicable to the hardware platform manufacturer implementation and/or add one or more additional files relating to the hardware platform manufacturer implementation.

In block 415, the system is capable of performing the modifications specified in block 410. In the example of block 410-1, the system is capable of replacing a specified hardware binary and/or software binary with a DCP or a reference to the configuration bitstream or software binary stored elsewhere in memory, e.g., not within the unified container. Replacing a file with a reference to the file allows a system to provide a unified container to a user without providing sensitive information such as the hardware binary or the software binary itself to the user. The user may trigger the loading of the hardware binary and/or the software binary using only the reference obtained from the unified container.

For example, within a hosted or cloud computing environment, unified containers may be provided to a user that include references to hardware and/or software binaries. The hardware and/or software binaries may be maintained in a secure area of the computing environment. The user may cause the computing environment to instantiate the hardware and/or software binary in a programmable IC within the computing environment (e.g., as a cloud computing resource) without ever having possession of the actual hardware and/or software binary. This type of procedure prevents tempering with the hardware binary and/or software binary which can prevent security risks and damage to equipment should the user or other party be permitted to modify the hardware and/or software binaries. A similar process can be performed where the unified container includes a DCP file and the secure area of the computing environment completes the design flow on the DCP file and then instantiates the resulting hardware binary into the programmable IC.

In the case of block 410-2, the system is capable of replacing the constituent file in the location with a modified and/or updated version of the constituent file. For example, the system is capable of overwriting a prior version of a file in the directory with a new version of the file for inclusion in the reformed unified container.

In the case of block 410-3, the system is capable of deleting one or more designated constituent files from the location in memory where the constituent files were extracted. In the case of block 410-4, the system is capable of adding one or more files. The system, for example, is capable of writing, e.g., copying, the files to be added to the unified container in the same area, e.g., folder or working directory, as the constituent files extracted from the first unified container.

In block 420, the system is capable of determining and/or updating attributes for any modified data section(s). In the case where a file from a data section is replaced with a replacement object and/or an updated version of the file, for example, the system is capable of updating the attributes for the data section. For example, the system is capable of recalculating the size of the data section.

In the case where a constituent file is removed, the attributes for the data section can be deleted. For example, the system is capable of deleting the section header corresponding to the particular file (and data section) that is deleted. In the case where one or more files are added, the system is capable of generating attributes for each data section (e.g., for each file to be added, where there is a one-to-one correspondence between added files and added data sections).

In block 425, the system is capable of determining and/or updating attributes for the container header. The system, for example, is capable of updating the number of section headers specified by the attributes for the container header, updating the overall size of the unified container, and updating the timestamp for the unified container. As discussed, the system is capable of storing the section headers and the container headers so that such data may be updated and need not be regenerated. Examples of data that need not be regenerated and, as such may be reused, include, but is not limited to, the tool version, the mode in which the unified container is generated, and the platform identifier (e.g., the hardware platform vendor).

In block 430, the system is capable of outputting the second unified container. For example, the system is capable of writing the second unified container, e.g., the reformed first container, to memory. The system is capable of writing the header structure using the unique identifier, the predetermined string, and the attributes of the container header as updated. The system is capable of writing each of the section headers by re-using the attributes of the data sections that have not changed and using the attributes of the data sections that have been updated. The system further is capable of writing each of the data sections.

Figure 5:
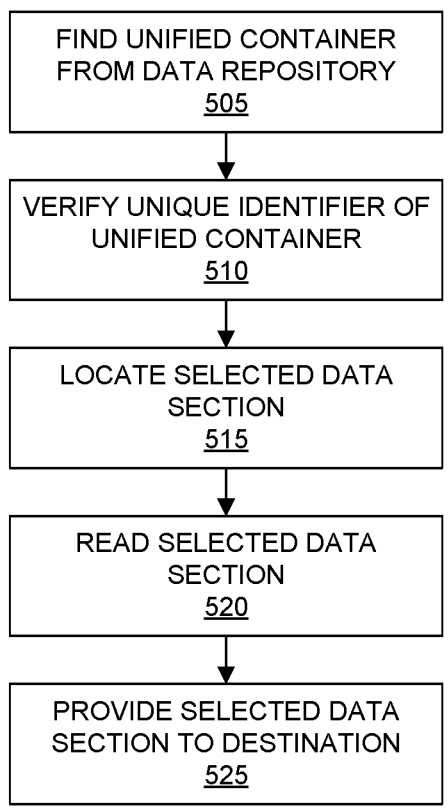
FIG. 5 illustrates an example method for handling a unified container.

FIG. 5 illustrates an example method 500 of handling a unified container. Method 500 is performed by a data processing system as described herein. For example, method 500 may be performed by system 100 during operation while executing a host application. In one or more embodiments, method 500 begins in a state where the system 100 receives a request for a unified container. The request may be received from another source and/or generated through execution of the host application. The request may specify a particular unified container. For example, the request may specify a path for the unified container as stored in a memory. In another example, the request may specify search criteria that may be used by the system to search for a particular unified container. For example, the criteria may specify one or more attributes such as a file name included within the unified container, a kind of data such as firmware, bitstream, clearing bitstream, partial configuration bitstream, or metadata, or the like.

In block 505, the system is capable of finding the unified container within a data repository. The data repository is a location in memory, e.g., a directory, where unified containers are stored. The data repository may be in a separate bulk storage device, a network attached storage device, or another computing system. In the case where the request specifies the path for the unified container, the system locates the unified container using the path.

In the case where the request specifies search criteria, in one or more embodiments, the system is capable of searching the container headers and/or the section headers of unified containers in the data repository for a unified container that matches the search criteria. Search criteria may be specified for any attribute and/or combination of attributes from the container header and/or section header(s) as described herein.

In particular embodiments, the search criteria is capable of specifying attributes found within metadata of the unified container(s) as opposed to attributes from the container header and/or section headers. In such cases, the system is capable of searching the metadata stored within the various unified containers. In one or more other embodiments, the system is capable of searching any combination of the container headers, section headers, and/or metadata of unified containers to find a unified container matching the search criteria.

For example, the attribute(s) may specify a particular functionality, a particular core, particular data type(s), or other circuit structure that is desired. The system is capable of searching the container headers, section headers, and/or metadata of unified containers to locate a file or files that meet the search criteria. In response to finding a file or files that meet the search criteria, the system selects the unified container that includes the file and/or files. The file(s), for example, may be a hardware binary and/or a software binary that matches the search criteria. As an illustrative and non-limiting example, the system is capable of searching for a particular unified container that includes a particular partial configuration bitstream such as a clearing bitstream.

In block 510, the system is capable of verifying the unique identifier of the unified container. Block 510 may be optionally performed. In one or more embodiments, the system is capable of creating a record stored in memory that includes the unique identifier of the most recent unified container used to configure the programmable IC. In block 510, the system is capable of reading the unique identifier of the unified container found in block 505 and comparing the unique identifier of the found unified container with the unique identifier stored in the record. In response to determining that the two unique identifiers match, the system is capable of terminating the method since the requested unified container is already being used to configure some aspect of the programmable IC. Otherwise the method 500 can proceed to block 515.

In block 515, the system is capable of locating the selected data section. The system is capable of reading the container header and the section header(s) of the selected unified container to determine the offset of the data section(s) of the unified container that includes the desired file or files. The system is capable of indexing into the unified container to the selected data section(s).

In one or more embodiments, the request for the unified container may specify a particular file or file(s) of the unified container. In one or more other embodiments, the request may specify search criteria for a file or files within the unified container. For example, the request may specify a particular file name, a particular type of data file such as a clearing bitstream, firmware, configuration bitstream, or the like that is to be extracted from the selected unified container. Search criteria may be specified for any attribute and/or combination of attributes from the container header and/or section header(s) as described herein. The system is capable of locating the file(s) within the unified container by reading the container header and/or the section header(s). The system, for example, is capable of comparing the attributes of any search criteria (e.g., including a file name and/or data type) with the attributes of the container header and/or section headers, determining the offset(s) of matching data section(s), and extracting the file(s) from the data section(s).

In one or more embodiments, the system is capable of determining a set of two or more files needed from the unified container based upon reading metadata contained within the unified container. The system, for example, is capable of reading the metadata to determine a set of two or more files that are related to one another. In an example, the set of files may be a hardware binary and a software binary intended to be used together and, as such, loaded together within the programmable IC. The software binary may be program code that is executed by an embedded processor specified by the hardware binary. In another example, the set of files may be two or more partial configuration bitstreams intended to be loaded together (e.g., operate concurrently) within the programmable IC.

By reading a metadata section of the unified container, for example, the system is capable of determining that a particular data section (having a file) of the unified container is intended for use with another data section (having a file) of the unified container. The metadata is capable of specifying dependencies among files of the unified container so that, for a given file to be obtained from the unified container, the system is capable of determining other related or dependent file(s) and obtaining the set of file(s) from the unified container by reading the metadata. Accordingly, the system is capable of extracting the plurality of related and/or dependent files and loading the plurality of files into the programmable IC together (e.g., for concurrent use within the programmable IC).

In one or more embodiments, the system is capable of determining whether a selected unified container includes metadata based upon the section headers. In response to determining that a unified container includes metadata, the system is capable of reading the metadata to determine any file dependencies. Accordingly, the system is capable of extracting a selected file and also any related and/or other files with dependencies with the selected file based upon the metadata.

In bock 520, the system reads the selected data section. By including the mapping data within the unified container itself, the system need not traverse the unified container to identify the different files included in the unified container and/or boundaries between files. Instead, the system is able to index directly to the desired file or files. As such, the system is capable of loading different portions of the unified container into memory on demand as needed, thereby saving memory resources of the data processing system and increasing execution speed.

In particular embodiments, the unified container allows each type of file that may be needed to configure the programmable IC to be included in a same binary file. Whether the files are hardware binaries, software binaries, and/or other data for debugging purposes as described herein, such data may be stored in a single or same unified container for a given programmable IC. This allows the system to manage the files needed for managing, debugging, and/or configuring the programmable IC in a more computationally efficient manner that facilitates faster runtime and reduced computational overhead (e.g., via simplified file management provided by the unified container) compared to other techniques.

In block 525, the system provides the file read from the selected data section to a destination. The runtime library included in the system, for example, includes functions for delivering the file to the appropriate destination.

In one or more embodiments, the entity requesting the unified container may also indicate a particular destination to which the file and/or files are to be provided. For example, the destination may be the programmable IC. The system is capable of providing a hardware binary and/or a software binary to a hardware driver that is capable of providing the hardware binary and/or software binary to the programmable IC.

In another example, the destination may be an emulator. The unified container may include an HDL version of a circuit design that may be provided to an HDL simulator. The HDL version may be stored in a debug type of data section. Accordingly, the system is capable of providing the HDL to a software driver that provides the HDL to the HDL simulator, whether executing within the system or within another system.

In still another example, the selected data section may be a software binary that is to be provided to a simulator. For example, the software binary may be the software to be executed by an embedded processor in the programmable IC and is to be debugged or otherwise tested. The system is capable of providing the software binary to a software driver that provides the software binary to a software emulator executing in a data processing system.

The structure of the unified container enables different parties to create customized drivers. For example, a developer is able to utilize the read and write utilities to create a driver that is capable of operating on a particular section of the unified container. This allows the third party to augment the unified container with any information that may be needed including proprietary information. The driver is capable of accessing only that data and skipping other data that the driver does not understand and/or is not configured to read.

In particular embodiments, a system may utilize a layered set of drivers where each driver operates on one or more different sections of the unified container. In an illustrative and non-limiting example, a third party may generate a driver that is capable of operating one on or more specific sections of the unified container that the third party added. Such sections, for example, may include proprietary data. The driver may operate in conjunction with one or more other drivers provided by the hardware platform manufacturer and/or the programmable IC manufacturer.

Figure 6:
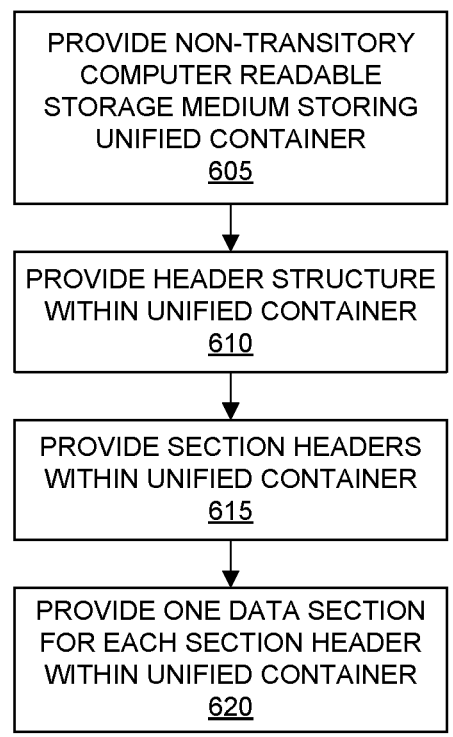
FIG. 6 illustrates another example method for implementing a unified container.

FIG. 6 illustrates an example method 600 of providing a unified container. In block 605, a unified container can be provided within a memory, e.g., a non-transitory computer readable storage medium. In one or more embodiments, the unified container is for configuring a programmable IC.

In block 610, a header structure is provided within the unified container. The header structure may have a fixed length. Further, the header structure may specify a number of section headers included in the unified container.

In block 610, a plurality of section headers are provided within the unified container. The section headers may sequentially follow the header structure. One section header may be provided for each data section to be included in the unified container. Each section header is capable of specifying a type of data stored in the corresponding data section and is capable of specifying mapping data for the corresponding data section.

In block 615, one data section is provided for each section header. The data sections can sequentially follow the section headers. As noted, one data section is provided for each section header. The data sections can include a first data section including a hardware binary and a second data section including a software binary. The hardware binary and the software binary configure the programmable IC.

Figure 7:
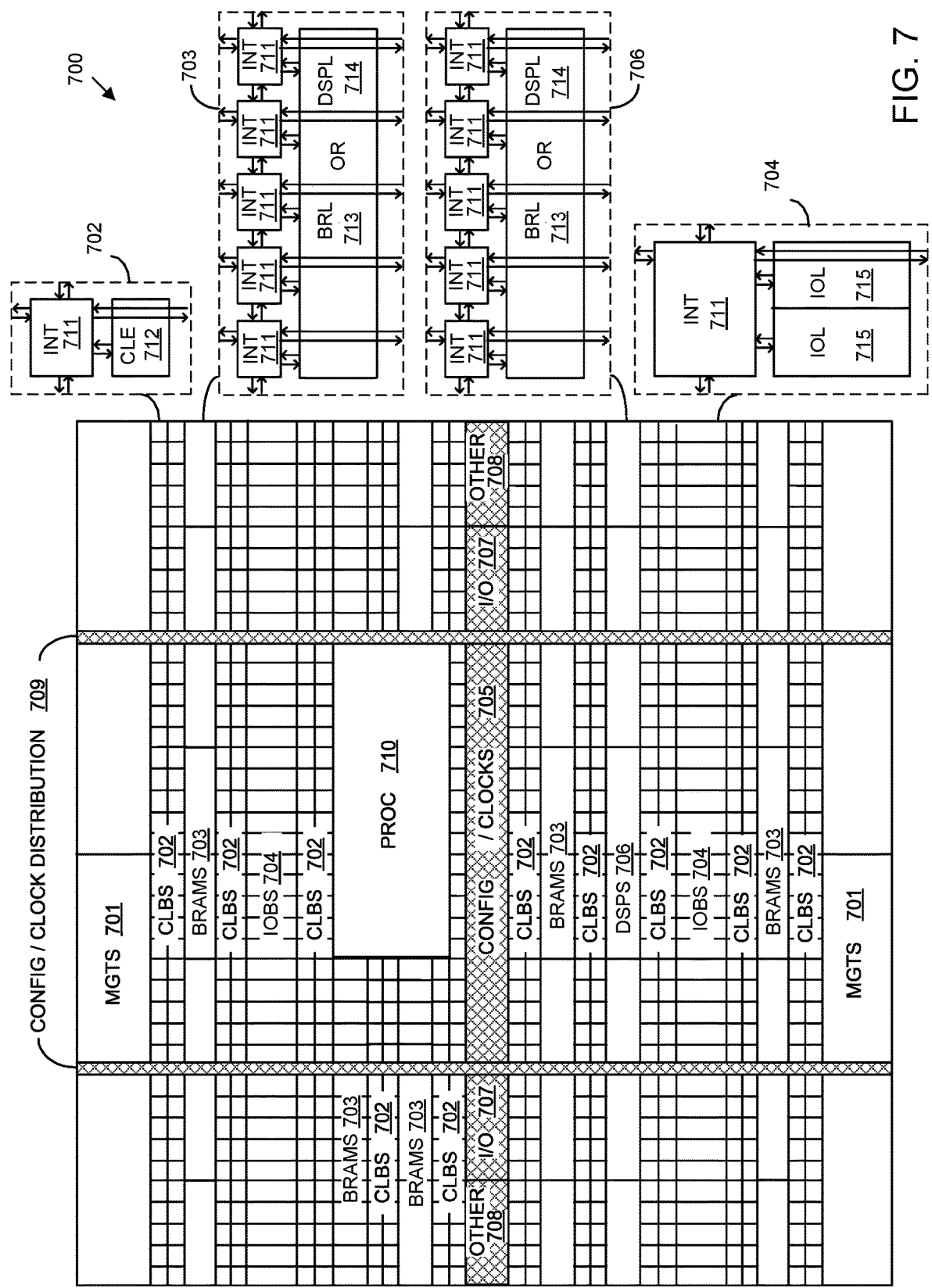
FIG. 7 illustrates an example architecture for an integrated circuit (IC).

FIG. 7 illustrates an example architecture 700 for an IC. In one aspect, architecture 700 may be implemented within a programmable IC. For example, architecture 700 may be used to implement a field programmable gate array (FPGA). Architecture 700, for example, may be used to implement programmable IC 135 of FIG. 1.

Architecture 700 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An 10B 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data (e.g., configuration bitstream) that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

A hardware binary, e.g., a configuration bitstream, specifies the circuitry that is to be implemented within the programmable circuitry. A software binary specifies the program code that is to be executed by PROC 710, whether a soft processor or a hard processor, or any other embedded processor within architecture 700. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

A unified container as described herein can include one or more hardware binaries and/or one or more software binaries to configure an IC implemented using architecture 700. The programmable circuitry of architecture 700 can be configured using one or more hardware binaries. The processor(s) of architecture 700 (e.g., one or more processors whether hardwired or soft processors) can be loaded with software binaries obtained from a unified container.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to computer program products. In an aspect, a computer program product includes a non-transitory computer readable storage medium storing a unified container for a programmable integrated circuit (IC). The unified container can include a header structure having a fixed length and specifying a number of section headers included in the unified container. The unified container also can include a plurality of section headers equivalent in number to the number of section headers specified in the header structure. The unified container further can include a plurality of data sections corresponding to the plurality of section headers on a one-to-one basis. The plurality of data sections can include a first data section including a hardware binary and a second data section including a software binary. The hardware binary and the software binary configure the programmable IC. Each section header can specify a type of data stored in the corresponding data section and a mapping for indexing to the corresponding data section.

In an aspect, the hardware binary is a configuration bitstream or a partial configuration bitstream specifying circuitry for the programmable integrated circuit.

In another aspect, the hardware binary is a design checkpoint file, a reference to a configuration bitstream, or a reference to a partial configuration bitstream.

In another aspect, the software binary is an ELF file.

In another aspect, the software binary includes program code executable by a processor of the programmable integrated circuit.

In another aspect, the header structure specifies a unique identifier for the unified container.

In another aspect, the unified container includes a third data section including metadata describing features of the hardware binary.

In another aspect, the unified container includes a third data section including metadata describing features of the software binary.

In another aspect, the unified container includes a third data section including debug data for the hardware binary or the software binary.

In another aspect, wherein the programmable IC is configured using at least one of the hardware binary or the software binary.

One or more embodiments are directed to methods for implementing a unified container. In one aspect, a method can include providing a non-transitory computer readable storage medium storing a unified container for a programmable IC. The method can include providing, within the unified container, a header structure having a fixed length and specifying a number of section headers included in the unified container. The method can include providing, within the unified container, a plurality of section headers equivalent in number to the number of section headers specified in the header structure. The method further can include providing, within the unified container, a plurality of data sections corresponding to the plurality of section headers on a one-to-one basis. The plurality of data sections including a first data section including a hardware binary and a second data section including a software binary. The hardware binary and the software binary are capable of configuring the programmable IC. Each section header can specify a type of data stored in the corresponding data section and a mapping for the corresponding data section.

In an aspect, the hardware binary is a configuration bitstream or a partial configuration bitstream specifying circuitry for the programmable IC.

In another aspect, the hardware binary is a design checkpoint file, a reference to a configuration bitstream, or a reference to a partial configuration bitstream.

In another aspect, the software binary is an ELF file.

In another aspect, the software binary includes program code executable by a processor of the programmable integrated circuit.

In another aspect, the header structure specifies a unique identifier for the unified container.

In another aspect, the unified container includes a third data section including metadata describing features of the hardware binary.

In another aspect, the unified container includes a third data section including metadata describing features of the software binary.

In another aspect, the unified container includes a third data section including debug data for the hardware binary or the software binary.

In another aspect, configuring the programmable IC using at least one of the hardware binary or the software binary.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer program product comprising:
    a non-transitory computer readable storage medium storing a unified container for configuring a programmable integrated circuit, wherein the unified container includes:
        a header structure specifying a number of section headers included in the unified container and a tool version used to create the unified container;
        a plurality of section headers equivalent in number to the number of section headers specified in the header structure;
        a plurality of data sections corresponding to the plurality of section headers, the plurality of data sections including a first data section including a first hardware binary and a second data section including a software binary;
    wherein each section header specifies a type of data stored in the corresponding data section and a mapping for indexing to the corresponding data section;
    wherein the first hardware binary is at least one of a pointer to a configuration bitstream stored outside of the unified container or a pointer to a partial configuration bitstream stored outside of the unified container;
    wherein a host processor is operable to configure the programmable integrated circuit using the first hardware binary by accessing the configuration bitstream or the partial configuration bitstream from a secure area outside of the unified container corresponding to the pointer without providing the configuration bitstream or the partial configuration bitstream to a user having access to the unified container thereby preventing tampering of the configuration bitstream or the partial configuration bitstream;
    wherein an electronic design automation tool replaces a design checkpoint file included in the unified container with the pointer, wherein the electronic design automation tool is configured to generate the configuration bitstream or the partial configuration bitstream from the design checkpoint file;
    wherein the programmable integrated circuit is configured using at least one of the first hardware binary or the software binary; and
    wherein the software binary includes program code executed by a processor of the programmable integrated circuit.

2. The computer program product of claim 1, wherein the unified container includes a third data section including a second hardware binary, wherein the second hardware binary is a configuration bitstream or a partial configuration bitstream specifying circuitry for the programmable integrated circuit.

3. The computer program product of claim 1, wherein the unified container includes a third data section including metadata specifying a dependency between the first hardware binary corresponding to a first partial configuration bitstream and a second hardware binary in a fourth data section corresponding to a second partial configuration bitstream, wherein a host processor, in response to reading the metadata, detects the dependency and loads the first partial configuration bitstream and the second partial configuration bitstream within the programmable integrated circuit, wherein the first partial configuration bitstream and the second partial configuration bitstream operate concurrently in the programmable integrated circuit.

4. The computer program product of claim 1, wherein the unified container includes a third data section including metadata specifying a dependency between the first hardware binary corresponding to a first partial configuration bitstream loaded into the programmable integrated circuit and a second hardware binary in a fourth data section corresponding to a second partial configuration bitstream, wherein a host processor, in response to reading the metadata, detects the dependency indicating that the second partial configuration bitstream is a clearing partial configuration bitstream for the first partial configuration bitstream and loads the second partial configuration bitstream into the programmable integrated circuit clearing the first partial configuration bitstream.

5. The computer program product of claim 1, wherein the header structure specifies a name of a further unified container daisy chained with the unified container.

6. A method for implementing a unified container, the method comprising:
   providing a non-transitory computer readable storage medium storing a unified container for a programmable integrated circuit;
   providing, within the unified container, a header structure specifying a number of section headers included in the unified container and a tool version used to create the unified container;
   providing, within the unified container, a plurality of section headers equivalent in number to the number of section headers specified in the header structure;
   providing, within the unified container, a plurality of data sections corresponding to the plurality of section headers, the plurality of data sections including a first data section including a first hardware binary and a second data section including a software binary;
   wherein each section header specifies a type of data stored in the corresponding data section and a mapping for indexing to the corresponding data section;
   wherein the first hardware binary is at least one of a pointer to a configuration bitstream stored outside of the unified container or a pointer to a partial configuration bitstream stored outside of the unified container;
   wherein a host processor is operable to configure the programmable integrated circuit using the first hardware binary by accessing the configuration bitstream or the partial configuration bitstream from a secure area outside of the unified container corresponding to the pointer without providing the configuration bitstream or the partial configuration bitstream to a user having access to the unified container thereby preventing tampering of the configuration bitstream or the partial configuration bitstream;
   wherein an electronic design automation tool replaces a design checkpoint file included in the unified container with the pointer, wherein the electronic design automation tool is configured to generate the configuration bitstream or the partial configuration bitstream from the design checkpoint file;
   wherein the programmable integrated circuit is configured using at least one of the first hardware binary or the software binary; and
   wherein the software binary includes program code executed by a processor of the programmable integrated circuit.

7. The method of claim 6, wherein the unified container includes a third data section including a second hardware binary, wherein the second hardware binary is a configuration bitstream or a partial configuration bitstream specifying circuitry for the programmable integrated circuit.

8. The method of claim 6, wherein the unified container includes a third data section including metadata specifying a dependency between the first hardware binary corresponding to a first partial configuration bitstream and a second hardware binary in a fourth data section corresponding to a second partial configuration bitstream, wherein a host processor, in response to reading the metadata, detects the dependency and loads the first partial configuration bitstream and the second partial configuration bitstream within the programmable integrated circuit, wherein the first partial configuration bitstream and the second partial configuration bitstream operate concurrently in the programmable integrated circuit.

9. The method of claim 6, wherein the unified container includes a third data section including metadata specifying a dependency between the first hardware binary corresponding to a first partial configuration bitstream loaded into the programmable integrated circuit and a second hardware binary in a fourth data section corresponding to a second partial configuration bitstream, wherein a host processor, in response to reading the metadata, detects the dependency indicating that the second partial configuration bitstream is a clearing partial configuration bitstream for the first partial configuration bitstream and loads the second partial configuration bitstream into the programmable integrated circuit clearing the first partial configuration bitstream.

10. The method of claim 6, wherein the header structure specifies a name of a further unified container daisy chained with the unified container.

\* \* \* \* \*